Sept. 4, 1945.  J. S. ALFORD  2,383,948
GAS TURBINE
Filed Jan. 22, 1943
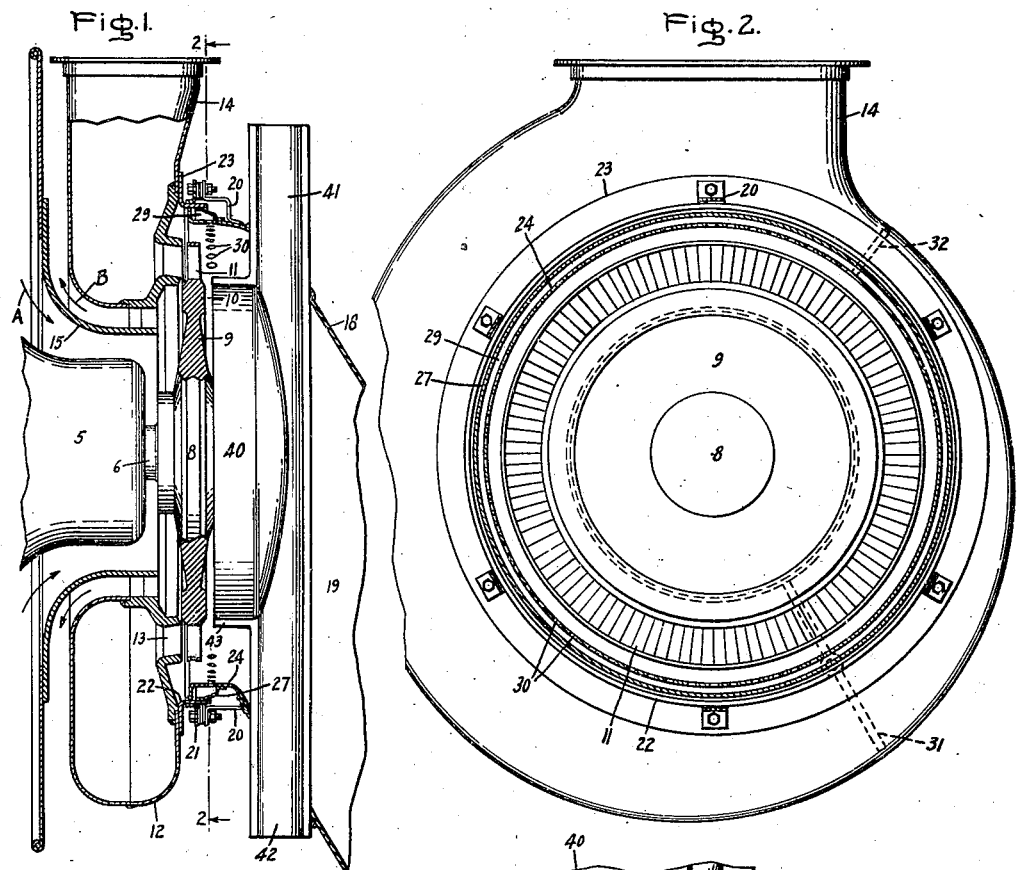
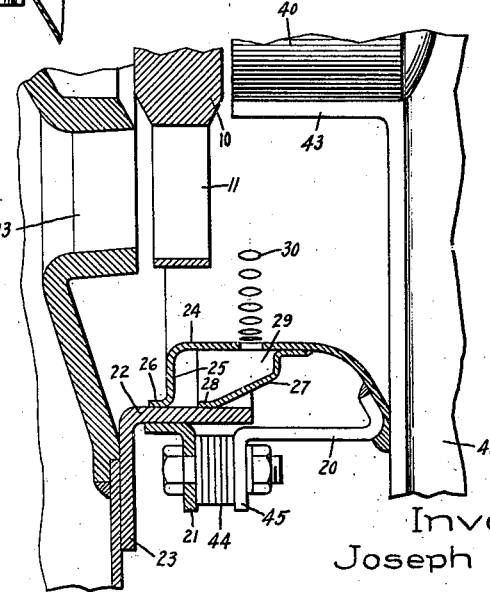
Inventor:
Joseph S. Alford,
by Harry E. Dunham
His Attorney.

Patented Sept. 4, 1945

2,383,948

UNITED STATES PATENT OFFICE 2,383,948

GAS TURBINE

Joseph S. Alford, Nahant, Mass., assignor to General Electric Company, a corporation of New York Application January 22, 1943, Serial No. 473,201

5 Claims. (Cl. 253—39)

The present invention relates to gas turbines. It is especially useful in connection with turbosuperchargers for aircraft wherein the turbine is operated by exhaust gases from an internal combustion engine. It is this application of my invention which I have elected to illustrate and describe. It is to be understood, however, that this is only by way of example and that the invention may be used wherever found applicable.

In connection with turbosuperchargers for aircraft, it is known to provide on the discharge side of the turbine wheel a unitary structure comprising a flighthood and a cooling cap, the unitary structure being attached to the nozzle box by suitable brackets in a manner such that the structure can be adjusted relatively to the turbine wheel to adjust the clearance between the edge of the cooling cap and the rim of the turbine wheel, it being desirable to have close clearance between these parts.

The function of a flighthood is to provide an exhaust chamber which receives the gases discharged from the turbine wheel, turns them, and directs them, in the case of an aircraft, into the slip stream. The purpose of the cooling cap is to protect the hub, web and rim of the turbine wheel from direct contact with hot exhaust gases and also to convey heat away from the wheel. In the case of an aircraft, the cooling cap is arranged usually to provide a cooling chamber through which air from the slip stream of the aircraft is circulated.

In certain applications, it is important that air be prevented from leaking into and becoming mixed with the gases discharged from the turbine buckets as this results in the burning of any unconsumed fuel in the gases, termed usually "after-burning."

One of the problems met with in the use of a structure comprising a combined flighthood and cooling cap is to provide a connection between it and the nozzle box for supporting it in a manner such that one may be adjusted relatively to the other and at the same time prevent air from leaking into the exhaust gas chamber defined by the flighthood.

An object of my invention is to provide in a gas turbine an improved arrangement for supporting such a structure which permits of the needed relative adjustment of the respective parts and at the same time prevents effectively leakage of air into the gases, and for a consideration of what I believe to be novel and my invention, attention is directed to the following specification and to the claims appended thereto.

In the drawing, Fig. 1 is a sectional view of a gas turbine (in the present instance the gas turbine of a turbosupercharger) embodying my invention; Fig. 2 is a sectional view taken on line 2—2, Fig. 1, and Fig. 3 is a detail sectional view on a larger scale.

Referring to the drawing, 5 indicates a bearing housing in which is located a bearing, not shown, for the turbosupercharger shaft 6. Overhung on the end of shaft 6 and suitably attached thereto is a turbine wheel comprising a hub 8, a web 9, a rim 10 and a ring of buckets 11. Surrounding bearing housing 5 in spaced relation thereto is an annular nozzle box 12 which carries a ring of nozzles 13 which direct exhaust gases from the nozzle box to the ring of turbine buckets. The inlet conduit of the nozzle box is indicated at 14. In the case of the usual turbosupercharger, there is provided also in connection with the nozzle box a waste conduit in which is located a waste gate valve for regulating the flow of exhaust gases to the turbine wheel. This is not shown in the present instance as it forms no part of my invention. It will be understood that in the case of a turbosupercharger the shaft 6 at its other end carries the impeller of a suitable centrifugal compressor. A turbosupercharger of the general type illustrated is shown in the patent to Clark 2,269,181, patented January 6, 1942, and assigned to the same assignee as the instant application.

At 15 is a curved baffle plate located between bearing housing 6 and the nozzle box which serves to direct the flow of cooling air to the entrance side of the wheel. The arrows A indicate the direction of air flow toward the wheel and the arrows B indicate the direction of the air flow away from the wheel. Usually, the cooling air is taken from the slip stream of the aircraft, flowing down across the bearing housing to cool the bearing, thence along the entrance side of the wheel and out as indicated by the arrows B.

The construction so far described is a known one and is to be taken as typical of any suitable gas turbine.

At 18 is indicated a flighthood for th turbine wheel which defines an exhaust chamber 19 which receives the gases issuing from the turbine buckets and directs them to the slip stream. Carried by and forming a unitary structure with the flighthood is a cooling cap 40. Any suitable cooling cap structure may be utilized. In the present instance, there is shown a cooling cap similar to that disclosed and claimed in my application Serial No. 439,405, filed April 17, 1942, and assigned to the same assignee as the present application. It comprises generally walls defining a cooling chamber to which cooling medium, for example air from an aircraft slip stream, is supplied through an inlet conduit 41 and from which it is discharged through an outlet conduit 42. The rim 43 of the cooling cap has a close clearance with the rim 10 of the turbine wheel.

The flighthood is supported on the nozzle box by a plurality of circumferentially spaced brackets 20, for example four, which at one end are suitably attached to the flighthood, by welding for example, and at the other end are bolted to lugs 21 carried on the under side of an axially extending ring or wall 22 and to which they may be attached by welding or the like. Ring 22 is provided with a flange 23 which is attached to the nozzle box preferably by welding. For adjusting the cooling cap relatively to the turbine wheel, shims as indicated at 44 may be inserted between lugs 21 and flanges 45 on brackets 20, these being the parts through which the bolts pass for attaching brackets 20 to lugs 21. The admission end 24 of the flighthood is spaced from the inner surface of ring 22 and is provided with a radially extending flange 25 having an axially extending lip 26 which has sliding engagement with the inner surface of ring 22. Brackets 20 are attached to the flighthood at points well spaced from lip 26. Attached to admission end 24 by welding or the like is an annular ring 27 provided with a lip 28 which has sliding engagement with the inner surface of ring 22 and defines with flange 25 an annular sealing chamber 29. In the wall of admission end 24 are spaced holes 30 which connect exhaust chamber 19 to sealing chamber 29. The sliding fit between lips 26 and 28 and the inner surface of ring or wall 22 permits these parts to move relatively to each other in case of any unequal expansion or contraction during operation; also it permits such relative movement when the cooling cap is adjusted to fix the clearance between the cooling cap rim 43 and the wheel rim 10.

Gases discharged from a turbine wheel have a radial component, i. e., they discharge not directly axially but at an outward angle of considerable magnitude. Holes 30 are so located that, when the turbine is operating, gases discharged from the turbine buckets will strike the wall of admission end 24 and passing through holes 30 build up a positive pressure in annular chamber 29. As a result, any leakage between the inner face of ring 22 and lip 26 will be in the form of gases passing to atmosphere rather than air into the exhaust chamber 19.

My invention has especial utility in instances where a portion of a nozzle ring is blanked off as in the case of partial admission, that is, where the nozzles occupy less than 360°, or in the case where a cruising valve is employed to render a part of a nozzle ring inactive since this provides an inactive arc adjacent to an active arc whereby the discharge of gases from the active arc has an ejector action on the adjacent inactive arc thus creating a region of negative pressure into which air tends to leak. In Fig. 2, 31 indicates a cruising valve which when closed cooperates with a partition wall 32 in the nozzle box to render inactive the arc of nozzles located between the cruising valve and the wall. No holes 30 are provided in the portion of wall 24 adjacent to the arc between wall 32 and valve 31, i. e., the inactive arc, since the presence of such holes would tend to counteract the building up of positive pressure in chamber 29.

By my invention, leakage is reduced to a minimum and such leakage as does occur is that of gases out to the atmosphere. As a result, I prevent effectively leakage of air to the interior of the flighthood. Broadly, according to my invention the end of the flighthood has a cylindrical wall portion 24 and side walls 25 and 27 which form an annular channel. The free ends of the side walls 25, 27 have a sliding fit with a cylindrical wall 22 concentrically spaced with the turbine wheel and securely sealed to the nozzle box. The annular sealing channel thus formed communicates through openings 30 with the exhaust end of the turbine to set up in said channel a sealing pressure above that of the atmosphere. The sliding fit between the flighthood and the nozzle box precludes the setting up of excessive stresses due to the high temperature of the gases during operation. In addition, the flighthood is rigidly and adjustably supported on the nozzle box by means of brackets secured to intermediate portions of the flighthood, which portions are substantially axially spaced away from the nozzle box whereby the rigid support does not affect the sliding fit between the end portion of the flighthood and the nozzle box.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a gas turbine, a turbine wheel, a flighthood, a wall surrounding the turbine wheel with which the entrance end of the flighthood has a sliding fit, means defining a sealing chamber adjacent to engaging parts of said wall and flighthood, means comprising openings in the entrance end of the flighthood for supplying to said chamber gases exhausting from the turbine wheel to build up a positive pressure in said sealing chamber, and means for rigidly supporting an intermediate portion of the flighthood.

2. In a gas turbine, a turbine wheel, a flighthood, a wall surrounding the turbine wheel with which the entrance end of the flighthood has a sliding fit, means defining a sealing chamber adjacent to engaging parts of said wall and flighthood, a wall of said chamber being provided with openings through which gases exhausting from the turbine wheel may pass to the chamber to build up a positive pressure therein, and bracket means for securely fastening to the first-named wall circumferentially spaced portions of the flighthood substantially axially spaced away from said first-named wall.

3. In a gas turbine, a turbine wheel, a nozzle box for supplying gases to the wheel, a flighthood, brackets attaching the flighthood to the nozzle box, said brackets being secured to intermediate portions of the flighthood, means defining a sealing chamber between the end portion of the flighthood and the nozzle box for preventing escape of air into the flighthood, and means for supplying to said chamber gases exhausting from the turbine wheel to build up a positive pressure in the sealing chamber.

4. In a gas turbine, a turbine wheel, an annular nozzle box for supplying gases to the wheel, an axially extending ring carried by the nozzle box surrounding the wheel, a flighthood the entrance end of which has a sliding fit with said ring, walls defining a sealing chamber adjacent to said entrance end and ring, means for supplying to said chamber gases exhausting from the turbine wheel to build up a positive pressure in said sealing chamber in order to preclude leakage of air from the atmosphere into the exhaust end of the turbine, and means securely supporting an intermediate portion of the flighthood on the nozzle box.

5. An exhaust gas operated aircraft turbine comprising a bucket wheel, means including a bearing for rotatably supporting the wheel, a nozzle box concentrically spaced from the bearing and located on one side of the wheel to conduct high temperature gases thereto, a cooling cap located on the discharge side of the wheel, a flighthood substantially enclosing the cooling cap for conducting exhaust gases from the bucket wheel to atmosphere, and means for sealing the flighthood to and supporting it on the nozzle box, said means comprising a cylindrical wall securely sealed to the nozzle box and concentrically surrounding the bucket wheel, a channel-shaped end portion formed by the flighthood having side walls forming sliding fit with said cylindrical wall, means including openings in the channel-shaped end portion for admitting exhaust gases from the turbine to the channel formed by said portion to set up a pressure in said channel above that of the atmosphere, and means including brackets for securely supporting an intermediate portion of the flighthood on the nozzle box.

JOSEPH S. ALFORD.